United States Patent
Lacasse

(10) Patent No.: US 9,282,834 B2
(45) Date of Patent: Mar. 15, 2016

(54) PROTECTIVE BED COVER ADAPTED FOR PETS

(71) Applicant: Christine Lacasse, West Palm Beach, FL (US)

(72) Inventor: Christine Lacasse, West Palm Beach, FL (US)

(*) Notice: Subject to any disclaimer, the term of this patent is extended or adjusted under 35 U.S.C. 154(b) by 0 days.

(21) Appl. No.: 14/206,530

(22) Filed: Mar. 12, 2014

(65) Prior Publication Data

US 2014/0259405 A1 Sep. 18, 2014

Related U.S. Application Data

(60) Provisional application No. 61/776,860, filed on Mar. 12, 2013.

(51) Int. Cl.
*A47G 9/02* (2006.01)
*A01K 1/035* (2006.01)

(52) U.S. Cl.
CPC ............ *A47G 9/0284* (2013.01); *A01K 1/0353* (2013.01)

(58) Field of Classification Search
CPC ..... A47G 9/0284; A47G 9/02; A47G 9/0238; A47G 9/0246; A47G 9/0253; A01K 1/0353
USPC .............. 5/482, 484, 485, 490–495, 499–502
See application file for complete search history.

(56) References Cited

U.S. PATENT DOCUMENTS

| | | | | |
|---|---|---|---|---|
| 1,425,952 A | * | 8/1922 | Fidler | 5/485 |
| 2,577,178 A | * | 12/1951 | Bellinger | 5/485 |
| 2,614,273 A | * | 10/1952 | Yancofski | 5/484 |
| 2,623,221 A | * | 12/1952 | Hickman | 5/485 |
| 2,789,292 A | * | 4/1957 | Budinquest | 5/486 |
| 3,011,182 A | * | 12/1961 | Burks | 5/484 |
| 3,109,474 A | * | 11/1963 | Levi | 150/158 |
| 3,148,388 A | * | 9/1964 | Espersen | 5/485 |
| 3,284,816 A | * | 11/1966 | Laubsch | 5/81.1 T |
| 3,521,309 A | * | 7/1970 | Evans | 5/494 |
| 3,824,640 A | * | 7/1974 | Golden | 5/485 |
| 4,627,123 A | * | 12/1986 | Uggerud | 5/485 |
| 4,734,947 A | * | 4/1988 | Vitale | 5/493 |
| 4,802,250 A | * | 2/1989 | Farr | 5/482 |
| 4,815,156 A | * | 3/1989 | Williams | 5/485 |
| 5,070,561 A | * | 12/1991 | Keidser | 5/482 |
| 5,118,553 A | * | 6/1992 | Boisson | 428/99 |
| 5,497,521 A | * | 3/1996 | Waits et al. | 5/658 |
| 5,509,156 A | * | 4/1996 | Smith | 5/482 |
| 5,537,952 A | * | 7/1996 | Devlin | 119/28.5 |
| 5,685,257 A | * | 11/1997 | Feibus | 119/28.5 |
| 5,956,768 A | * | 9/1999 | Pearson | 2/69.5 |

(Continued)

*Primary Examiner* — David E Sosnowski
*Assistant Examiner* — Eric Kurilla
(74) *Attorney, Agent, or Firm* — Allen F. Bennett; Bennett Intellectual Property

(57) ABSTRACT

A pet protective bedding that includes a flat top, a flap, and a bed skirt. The flat top is sized to cover or approximately cover the top surface of a bed, i.e. the top surface of a mattress and conventional bedding. The flap is integrally attached to flap top at the top end, and is sized and configured for an upper portion of the flap to be folded over and on top of one or more pillows on the bed for encasing the pillows in order to protect the pillows from exposure to any production of pet soiling. The bed skirt is integrally attached at opposite sides and bottom end of the flat top, and is sized and configured to hang down from the flat top and adjacent to the bed mattress and box spring to the floor. A pocket at the bottom end of the flat top is sized and configured for engaged receipt of a pet or, in the alternative, a portion of a person's legs and feet.

5 Claims, 3 Drawing Sheets

(56) References Cited

U.S. PATENT DOCUMENTS

| | | | |
|---|---|---|---|
| 6,148,458 A * | 11/2000 | Hires | 5/485 |
| 6,233,762 B1 * | 5/2001 | Bradley | 5/484 |
| 6,539,565 B1 * | 4/2003 | Trimble | 5/485 |
| 6,557,193 B1 * | 5/2003 | Griffith | 5/493 |
| 6,845,532 B1 * | 1/2005 | Rosenblum | 5/482 |
| 7,207,078 B1 * | 4/2007 | Lakic | 5/493 |
| D587,952 S * | 3/2009 | Skipper | D6/603 |
| 7,971,292 B1 * | 7/2011 | Sithian | 5/485 |
| 8,127,378 B1 * | 3/2012 | Mintz | 5/485 |
| 8,359,687 B2 * | 1/2013 | Marlowe | 5/655 |
| 8,464,657 B1 | 6/2013 | King | |
| 8,490,229 B2 * | 7/2013 | Mintz | 5/485 |
| 8,627,521 B2 * | 1/2014 | Rowson et al. | 5/496 |
| 2003/0070232 A1 * | 4/2003 | Diak/Ghanem | 5/496 |
| 2003/0172457 A1 * | 9/2003 | Pilling et al. | 5/484 |
| 2003/0221257 A1 * | 12/2003 | Drexler | 5/486 |
| 2007/0056099 A1 * | 3/2007 | Langenberger | 5/493 |
| 2008/0010746 A1 * | 1/2008 | Ho | 5/482 |
| 2008/0034500 A1 * | 2/2008 | Costello | 5/485 |
| 2008/0040855 A1 * | 2/2008 | Ho | 5/482 |
| 2008/0178386 A1 * | 7/2008 | Thompson | 5/485 |
| 2008/0201845 A1 * | 8/2008 | Canning | 5/484 |
| 2009/0013466 A1 * | 1/2009 | Yates et al. | 5/490 |
| 2009/0056017 A1 * | 3/2009 | Jones et al. | 5/485 |
| 2009/0077746 A1 * | 3/2009 | Wilson | 5/485 |
| 2009/0249549 A1 * | 10/2009 | Margrander | 5/485 |
| 2010/0043144 A1 * | 2/2010 | Thompson | 5/485 |
| 2010/0050341 A1 * | 3/2010 | Tepper | 5/488 |
| 2011/0000020 A1 * | 1/2011 | Walvius et al. | 5/495 |
| 2011/0016631 A1 * | 1/2011 | Stewart et al. | 5/501 |
| 2011/0162139 A1 * | 7/2011 | Grubb et al. | 5/499 |
| 2011/0302713 A1 * | 12/2011 | Martenson | 5/482 |
| 2011/0302714 A1 * | 12/2011 | Martenson | 5/482 |
| 2012/0030874 A1 * | 2/2012 | Walvius et al. | 5/484 |
| 2012/0073050 A1 * | 3/2012 | Robbins | 5/502 |
| 2012/0096642 A1 * | 4/2012 | Hickman | 5/482 |
| 2012/0110736 A1 * | 5/2012 | Hall | 5/482 |
| 2013/0055501 A1 * | 3/2013 | Lisboa | 5/494 |
| 2013/0067660 A1 * | 3/2013 | Sloan | 5/494 |
| 2013/0117933 A1 * | 5/2013 | Mickle et al. | 5/413 R |
| 2013/0189898 A1 * | 7/2013 | Abbott | 446/73 |
| 2013/0263375 A1 * | 10/2013 | Regan et al. | 5/500 |
| 2013/0291303 A1 * | 11/2013 | Martenson | 5/490 |
| 2013/0318712 A1 * | 12/2013 | Cordoves et al. | 5/485 |
| 2014/0000029 A1 * | 1/2014 | Masoncup | 5/493 |
| 2014/0013507 A1 * | 1/2014 | Perez | 5/485 |
| 2014/0201911 A1 * | 7/2014 | Martenson | 5/485 |

* cited by examiner

PROTECTIVE BED COVER ADAPTED FOR PETS

CROSS-REFERENCE TO RELATED APPLICATIONS

This application claims priority to U.S. Provisional Application Ser. No. 61/776,860, filed Mar. 12, 2014, the contents of which are hereby incorporated in its entirety.

BACKGROUND OF THE INVENTION

1. Field of Endeavor

The present invention relates to protective covers for beds. More particularly, the invention relates to protective coverings for beds adapted for pets designed to cover a conventional bed, protect it from pets, and provide greater comfort for both pets and owners.

2. Background Information

Pets have truly become members of the American family. Estimates from the 2013-2014 APPA survey states there are 82.5 million homes with at least one pet in the United States. In short, 68% of all households have pets. 46.7% of the 82.5M pets are dogs while 37.3% are cats. This means approximately 38.5M are dogs and 30.8M are cats with a combined total of roughly 69.3M pets.

Dogs and cats are known for their tendency to jump onto their owner's beds, and in many cases sleep with their owners. Many people love their pets and allow them to sleep on the bed. Unfortunately, this means pet hair, dirt from paws, and even granules of kitty litter are often left behind on bed linens. This can result in damage to the bedding from the pet's claws or soiling of the bed sheets and blankets.

Estimates of the number of people who sleep with their pets or whose pets reside on their bed at some point during the day are as high as 50%. In an effort to protect their beds, many pet owners often cover their bedding with a sheet, a fleece throw or blanket on top of the layer of bedding they sleep in. Other pet owners elect to buy multiple duvets or bedding so that they can be regularly swapped. Extra sheets or fleece throws often end up in a ball after the pets turn around a few times while frequently washing duvets is cumbersome, time-consuming and may be quite expensive.

While different beddings have been developed for the purpose of protecting the bed from pet hair and pet soiling, they have not been designed to benefit of the pet and its owner.

It is therefore desirable to provide a product that overcomes these deficiencies, limitations and shortcomings of the prior art to benefit pet owners whose pets nap on or sleep in their owner's beds.

It is also therefore desirable to provide a multipurpose utilitarian product that protects a pet owner's bedding.

It is also desirable to provide a protective device that includes an aesthetic or decorative element while protecting the bedding underneath it.

BRIEF SUMMARY OF THE INVENTION

Accordingly, the primary object of the present invention is to provide a device for protecting a bed, bed sheets, comforters and other items commonly used in conjunction with a bad from unwanted deposits and/or staining from pets. In addition, the principles of the invention provide a pet bedding material that may be incorporated into a protective covering.

In greater detail, the principles of the invention are directed to a protective bed cover that includes a cover, a pillow flap, a panel and a skirt. The cover may be sized to cover or approximately cover the top surface of a bed, i.e. the top surface of a mattress and conventional bedding. The pillow flap may be attached to the flap top at the head end of the cover, and may be sized and configured for to be folded over and on top of one or more pillows on the bed for, thereby encasing the pillows in order to protect them from exposure to pet soiling or to wrap around a pet owner's shoulders while reading in bed or to cover the eyes of a napping pet owner. The bed skirt may be attached along the periphery of the cover, and may be sized and configured to hang down from the cover and adjacent to the bed mattress and box spring to the floor. A panel or pocket at the bottom end of the flat top is sized and configured for pets to burrow in or, in the alternative, for receipt of a portion of the pet owner's legs and feet.

In one embodiment, a protective bedding cover comprises a cover having a periphery, a head region and a foot region, a pillow flap attached to the head end of the cover and capable of covering pillows placed in the head region of the cover, a panel and a skirt extending downward from the periphery of the cover.

The panel on the foot region of the cover may be stitched to the cover on three sides, thereby forming a pocket. The panel on the foot region of the cover also may be stitched to the cover on four sides and does not form a pocket. The panel also may be located in the foot region of the cover and the pillow flap extends from the top of the head region to the panel when folded flush with the cover. The panel may also be removably attachable to the cover in a plurality of locations.

The skirt may include slits such that it is capable of being placed on a bed having bed posts. The protective bedding cover of claim 1 may further comprise piping along the periphery of the cover.

In another embodiment A protective bedding cover may comprise a cover having a periphery, a head region and a foot region, a pillow flap attached to the head end of the cover and capable of covering pillows placed in the head region of the cover and a skirt extending downward from the periphery of the cover.

In a further embodiment, A protective bedding cover may comprise a cover having a periphery, a head region and a foot region, a panel and a skirt extending downward from the periphery of the cover.

It is therefore an object of the present invention to provide a pet bed and a protective bedding that is adapted for pets that sleep with their owners and is designed to cover a conventional bed, including the mattress, box spring, pillows and conventional bedding.

It is a further object of the present invention to provide pets a comfortable environment to sleep with their owners while providing minimal soiling with the protective bedding over the bed mattress, pillows and conventional bedding.

It is a further object of the present invention to provide a decorative element to beds while being a protective cover since it eliminates the necessity for a bed skirt, pillow shams, a decorative comforter or blanket and since its design incorporates both a flap to cover multiple pillows, as well as, a bed skirt.

It is a further object of the present invention to generate a cost savings in not having to purchase bed skirts, pillow shams, or decorative comforters or blankets.

It is yet a further object of the present invention to decrease the frequency in which conventional bedding under the protective cover must be laundered.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
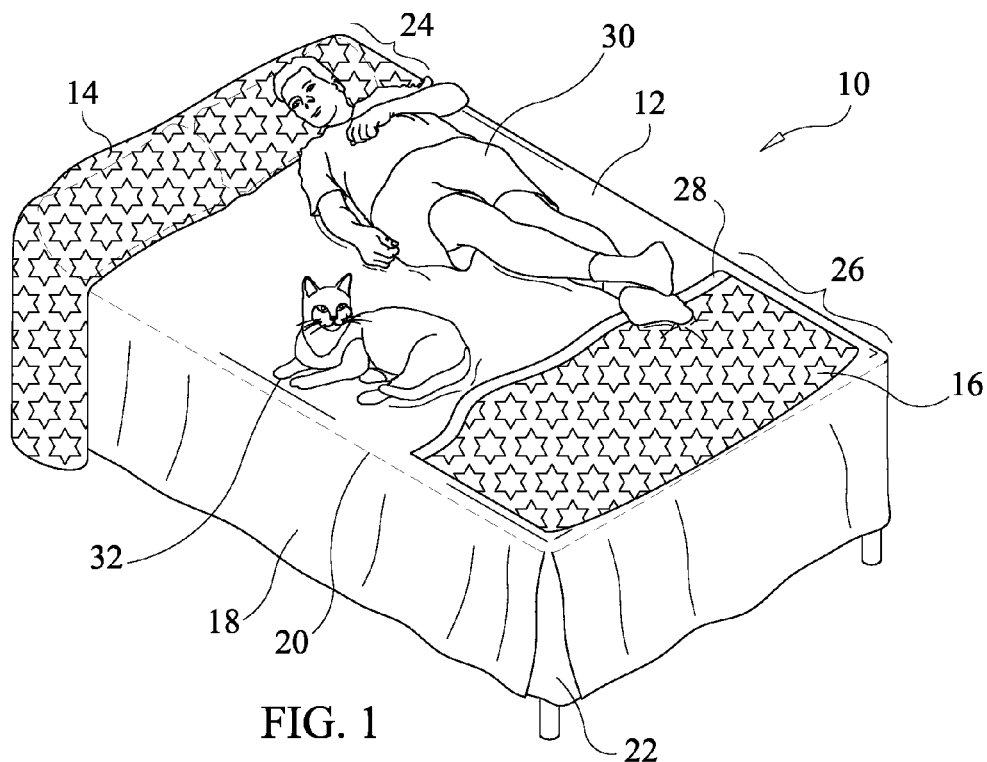
FIG. 1 is an environmental perspective view of a protective bed cover in accordance with the principles of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Disclosed is a decorative and protective bed cover that includes a cover, a pillow flap, and a bed skirt. The cover may be sized to extend over the entire surface of a bed, i.e. the top surface of a mattress and conventional bedding, extending from the head of the bed to the foot of the bed. As used herein, the "head" of the bed generally refers to the end of the bed where pillows are placed and where a person generally rests his or her head during sleep. Similarly, the "foot" of the bed generally refers to the end of a bed where the feet are placed. It is often possible to reverse the head and foot of a bed, and as such, these terms should not be considered limiting.

The pillow flap may be attached at the head end of the panel, and sized and configured to be folded over and on top of one or more pillows at the head of the bed, thereby encasing the pillows in order to protect them from exposure to pet soiling, to wrap around a pet owner's shoulders while reading in bed, and/or to cover the eyes of a napping pet owner. The bed skirt may be attached about the periphery of the cover and configured to hang downward from the panel to the floor. A panel or pocket at the bottom end of the cover may be sized and configured for pets to burrow in or optionally to cover a pet owner's legs and feet while lying on the bed.

A medium weight bed cover may have fleece pillow flaps that cover pillows and shams at the head of the bed and provide a barrier which prevents direct contact between pets and pillows when the pets lounge against the pillows. A fleece panel and/or pocket may provide an attractive alternative location for a pet to lounge. A cat, dog, or other pet may sleep on top of a panel or burrow into the pocket to sleep.

At night the pillows may be removed from the flap. The flap may then be folded down over the cover such that it extends from the head of the cover to the top of the fleece panel or pocket at the bottom of the bed. This may provide a solid layer of fleece. While lounging on the bed, a person may read a book, knit or nap with his or her feet and pet in the pocket and the fleece flap may be placed about the shoulders.

A lightweight dual fabric bed cover may be made of a lightweight cotton sheet with a flannel pillow flap and a flannel panel or pocket at the foot of the cover. Its weight may be comparable to a single sheet covering the bed. The flannel flap may also fold down and extend to the flannel panel or pocket, thereby providing a single layer of flannel across the top of the mattress when the pillows are removed. Thus a bed cover in accordance with the principles of the invention may provide dual functionality and be easily managed by seniors, apartment or condo dwellers and may provide two soft flannel areas for a person and/or pet to lounge or burrow. The bed cover may optionally have a bed skirt having slits which allow it to fit around bedposts, with no footboard or on a platform bed.

A single fabric bed cover may be formed from extremely lightweight material and include piping about its periphery to provide structure, form and rigidity.

FIG. 1 shows a perspective environmental view of a protective bedding cover 10 in accordance with the principles of the invention. Protective bedding cover 10 includes a cover 12, a pillow flap 14, a panel 16 and a skirt 18. The cover 12 may be a substantially rectangular and planar piece of material configured to cover approximately all of the top of a typical bed. Cover 12 may be sized to cover a mattress of any size, including single, double, twin, Queen and King sizes, or other standardized sizes, e.g. European bed sizes or inflatable mattress sizes. Cover 12 is defined by a periphery 20 along the edges of the top of the bed. The skirt 18 may extend downward from the periphery and may include one or more slits 22 that may accommodate bedposts. The skirt 18 may optionally also be ruffled or pleated. In addition, the periphery 20 may include piping or a similar mechanism to provide structure and definition to the protective bedding cover 10.

The cover 12 may be made of any suitable material and may be lightweight, or may be heavy. For example, the cover 12 may be formed from linen or silk, or may optionally be formed of denim, fleece or even burlap. The cover may optionally be comprised of more than one layer. Optionally, one of the layers of cover 12 may include waterproof and/or airtight material. A cover having waterproof material may be beneficial in preventing a pet from staining sheets, comforters, or other items underneath the protective bedding cover 10. It is known that pets on occasion may urinate, vomit or otherwise, deposit undesirable materials on a bed. When a protective bedding cover in accordance with the principles of the invention is utilized, such unwanted deposits by pets will not stain or ruin sheets, comforters and other bedding items.

The pillow flap 14 may fold over one or more pillows. In this embodiment, the pillow flap 14 may be attached to the end of the cover 12 at the head of the bed. Pillows may then be placed on the head region 24 of the cover 12, and the pillow flap 14 may be folded over them. The pillow flap 14 may be lightweight or heavyweight, similar to cover 12 explained above. Optionally, pillow flap 14 may also be comprised of one or more layers and may incorporate a waterproof or airtight layer. It is known that pets often like to lay over the pillows on a bed. If the pillow flap 14 incorporates waterproof or airtight material, pillows may be protected in the same manner that sheets, and comforters may be protected by the cover 12.

The panel 16 may be located in the foot region of the cover 12. Panel 16 may be comprised of any suitable material. As explained above for the cover 12 and the pillow flap 14. However, it may be desirable for panel 16 to be comprised of a material designed more for comfort or warmth. Panel 16 may be sewn to cover 12 in order to provide a pocket underneath the panel. Panel 16 may include a lip 28 that have ruffles, pleats or other structures for facilitating a pets access into the pocket. Such features on the lip 28 may make it easier for a pet to burrow into the pocket. It is known that pets like to burrow with in their owners bed. By providing this pockets, a pet may be allowed to burrow without venturing into the owners sheets, and comforter. This may prevent hair, dander and other unwanted detritus associated with pets. Because the panel 16 may be designed to attract pets to it rather than other regions of the bed, it may be desirable for panel 16 to be comprised of a material particularly appealing to pets.

Figure 2:
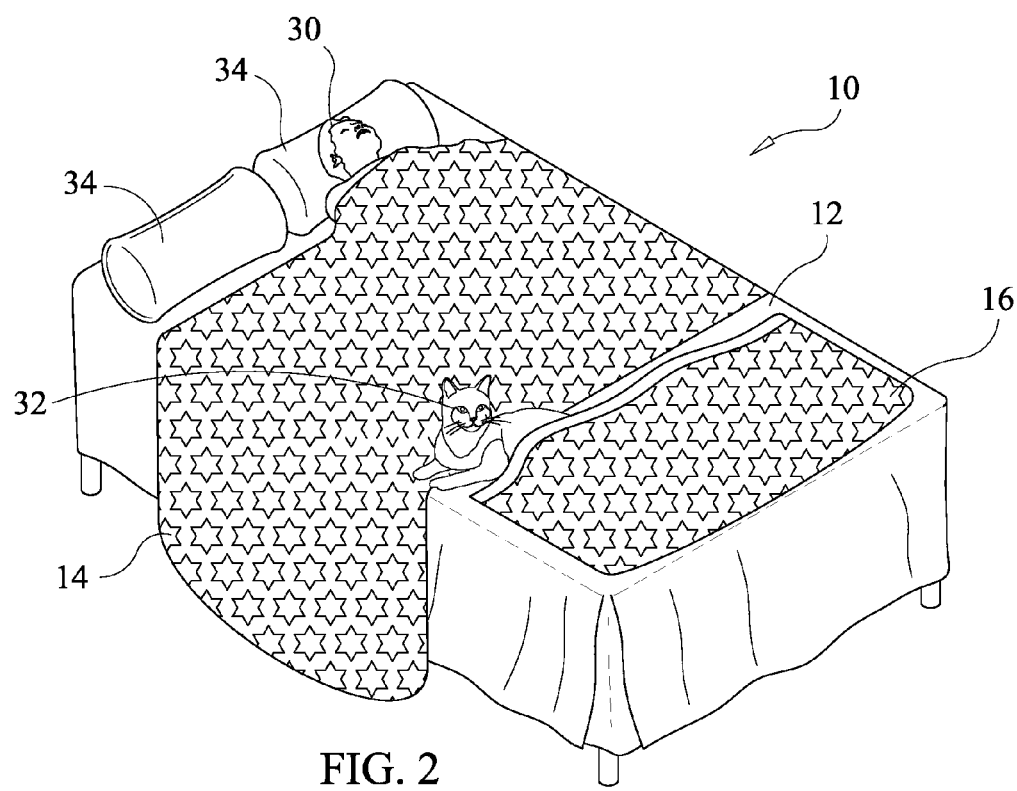
FIG. 2 is another environmental perspective view of a protective bed cover in accordance with the principles of the invention.

FIG. 1 shows the protective bedding cover 10 in use by a pet owner 30 and a pet 32. FIG. 2 also shows the protective bedding cover 10 in use by a person with 30 and a pets 32. However, in FIG. 2. The pillows 34 have been removed from the pillow flap 14 and the pillow flap 14 has been laid over cover 12. In this embodiment, pillow flap 14 may extends across cover 12 to panel 16 when it is laid over cover 12. In this manner, pillow flap 14 may optionally function to provide warm to the person 30 while sleeping. In addition, it may form and an aesthetically pleasing configuration. In this embodiments, the pillow flap 14 and the panel 16 are decorated with the same pattern. Thus, the cover protects the person's bed materials and is also decorative. FIG. 2 also shows the pet 32. Partially covered by the panel 16. By forming a pocket, panel 16 allows the pet 32 to burrow, keeps the pet 32 from burrowing under the sheets, and comforter of the bed, and also may assist in keeping a pet, you the foot of the bed instead of in the middle of the bed or other inconvenient place.

Figure 3:
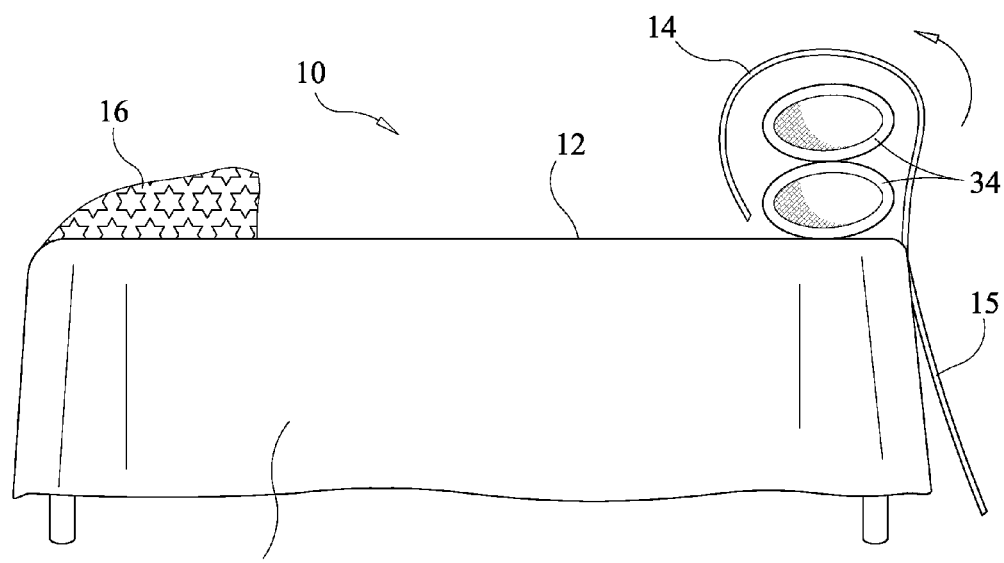
FIG. 3 is a side view of a protective bed cover in accordance with the principles of the invention.

FIG. 3 shows a side view of the protective bedding cover 10. In this figure, pillows 34 may be seen underneath pillow flap 14. The protective bedding cover 10 may optionally include a secondary pillow flap 15 that may also be folded over the pillows or may extend downward from the head of the bed in a similar fashion as the skirt 18 hangs about the periphery of the cover 12.

In these figures, the head of the bed and the head region of the cover typically refers to the side of the bed where pillows may be placed. Similarly, the foot of the bed and the foot region generally refers to the part of the bed where a user typically rests feet. However, the configurations of the components of the bedding cover 10 may be arranged such that the head and foot of the bed are essentially reversed.

Figure 4:
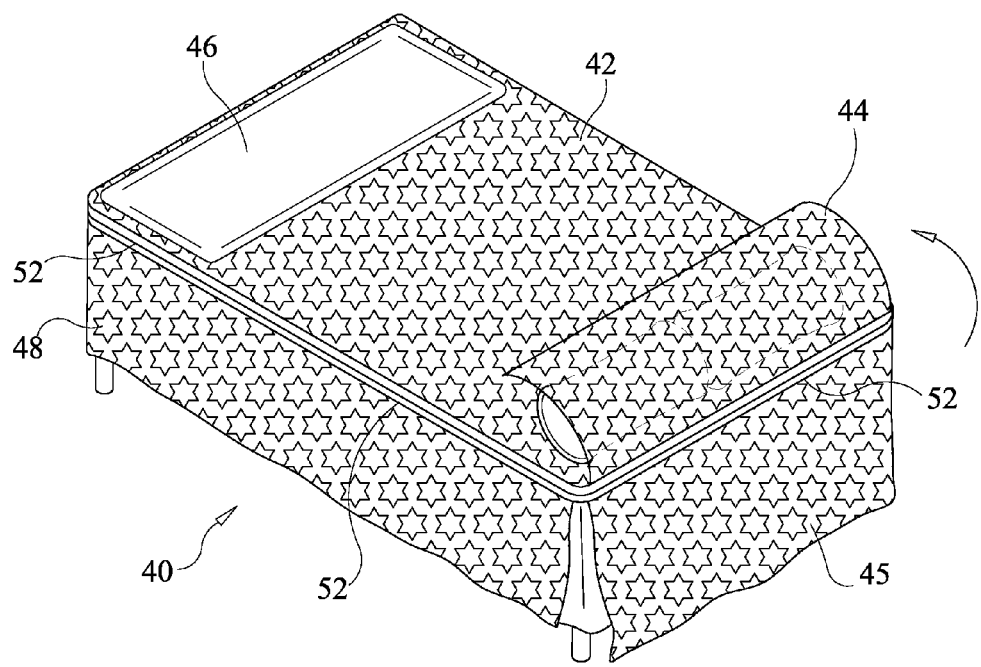
FIG. 4 is a perspective view of an alternative embodiment of a protective bed cover in accordance with the principles of the invention.

FIG. 4 shows an alternative embodiment of a protective bedding cover 40. Protective bedding cover 40 includes a cover 42, a pillow flap 44, a panel 46 and a skirt 48. In this embodiment, the periphery 50 of the cover 42 includes piping 52. Piping 52 may also be located at the head in of the cover 42, where the pillow flap 44 attaches to the cover 42. A secondary pillow flap 45 may also attached to the cover 42 at the piping 52. Optionally, a set of a secondary pillow flap, flap 45 may serve as part of the skirt.

In this embodiment, panel 46 may be stitched or otherwise attached to the cover 42, such that a pocket is not form. Larger pets may not desire to burrow in a bed and therefore a pocket may not be necessary. Optionally, the protective bedding cover 40 may include a protective material that is waterproof or airtight as part of the panel 46 only. The cover 42 may offer less protection and may be designed primarily to prevent hair and dander from being deposited on the bed underneath. The pillow flap 44 may also be similarly designed primarily to protect against hair and dander. This may allow a more sturdy panel 46 to be Incorporated into a protective bedding cover while more comfortable or more aesthetically pleasing materials are used for the cover 42 and pillow flap 44.

Figure 5:
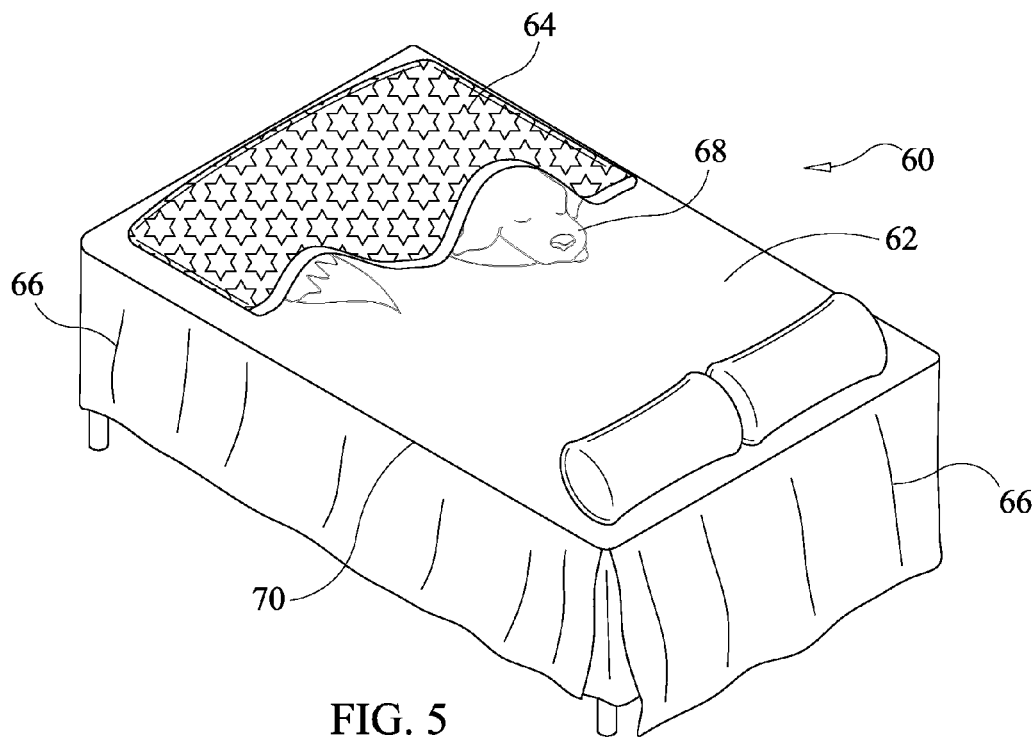
FIG. 5 is a perspective view of an alternative embodiment of a protective bed cover in accordance with the principles of the invention.

FIG. 5 shows an alternative embodiment of a protective bedding cover 60 in accordance with the principles of the invention. Protective bedding cover 60 may include a cover 62, a panel 64 and a skirt 66. Panel 64 may be stitched to the cover 62 on three sides in order to provide a pocket which a pets 68 may burrow into. In this embodiment, no pillow flap may be included. But the skirt 66 may extend completely about the periphery 70 of the cover 62.

Figure 6:
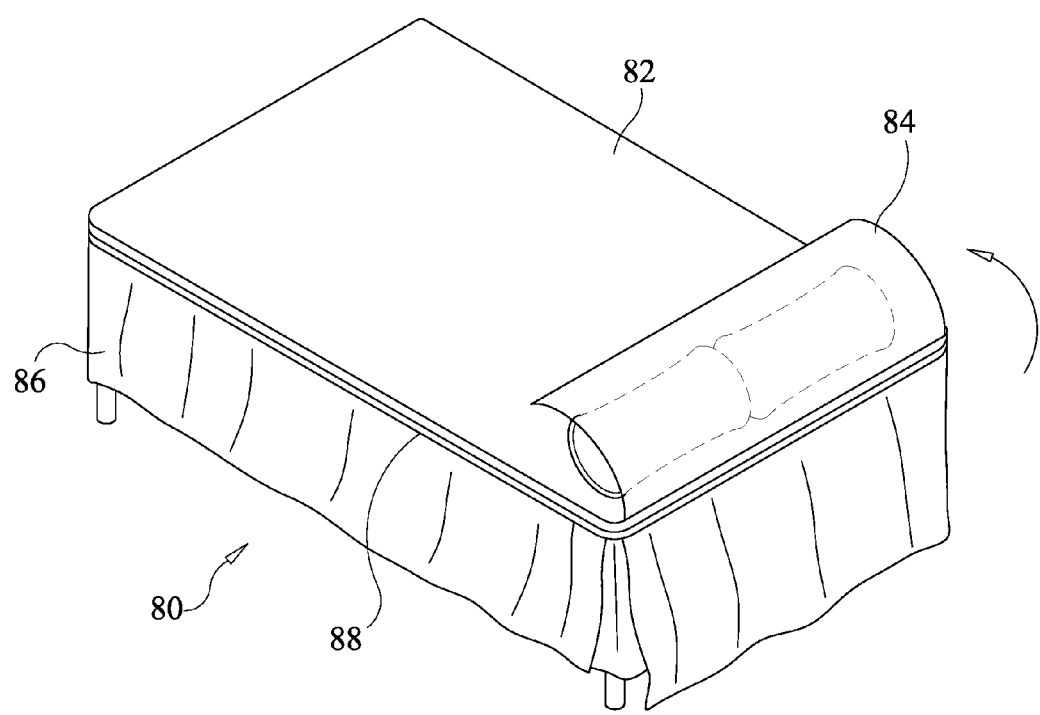
FIG. 6 is a perspective view of an alternative embodiment of a protective bed cover in accordance with the principles of the invention.

FIG. 6 shows an alternative embodiment of the protective bedding cover 80 in accordance with the principles of the invention. Protective bedding cover 80 includes a cover 82, a pillow flap 84 and a skirt 86. In this embodiment, the periphery 88 of the cover 82 may include piping used in conjunction with double stitching in order to provide structure along the periphery 88. Other mechanisms to provide definition and/or structure to components of the protective bedding cover. In this embodiments, it may be desirable to form cover 82 and pillow flap 84 from more protective material.

In the embodiments shown, the panel and/or pocket for a pet to lie on or in has been shown located in the foot region of the protective bed cover. However, the panel or pocket may be placed anywhere on the protective bed cover, including positioning it integral to the pillow flap, or on one side of the cover. Optionally, more than one panel or pocket may be attached to the cover. Optionally, instead of the panel being stitched to the cover, it may be removably attached, with for example snaps, buttons, laces, velcro, zippers or other mechanisms for removable detachment. Optionally, a removably attachable panel or pocket may be attachable to several points on the cover. For example, the cover may include a plurality of buttons or snaps placed all over the cover, in a grid pattern or otherwise, to allow a panel or pocket to be placed in different locations about the cover.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A protective bedding cover comprising:
   a continuous cover having a periphery, a head region and a foot region;
   a pillow flap having an attached edge and an opposite terminal edge, wherein the attached edge is attached to a head end of the cover;
   a panel located in the foot region of the cover is stitched to the cover on three sides, thereby forming a pocket between the panel and the cover into which a pet may burrow without going under the cover; and, a skirt extending downward from the periphery of the cover;

wherein the pillow flap has a stored configuration in which the flap is folded over one or more pillows at the head region of the cover and the terminal edge of the flap is folded underneath said pillows; and, wherein the pillow flap has an extended configuration in which the flap is laid flat over the cover and extends across the cover such that the terminal edge of the flap contacts an unstitched side of the panel to provide a solid layer of material.

2. The protective bedding cover of claim 1 wherein the skirt includes slits such that it is capable of being placed on a bed having bed posts.

3. The protective bedding cover of claim 1 further comprising piping along the periphery of the cover.

4. The protective bedding cover of claim 1 wherein the cover includes a layer of waterproof material.

5. The protective bedding cover of claim 1 wherein the panel and pillow flap are made from a stain resistant material.

* * * * *